United States Patent [19]

Bowen

[11] 4,108,402
[45] Aug. 22, 1978

[54] AIRCRAFT EMERGENCY LETDOWN SYSTEM

[75] Inventor: Arthur D. Bowen, Phoenix, Ariz.

[73] Assignee: Eleanor J. Bowen, Phoenix, Ariz.; a part interest

[21] Appl. No.: 758,960

[22] Filed: Jan. 13, 1977

[51] Int. Cl.² ............................................. B64D 17/62
[52] U.S. Cl. ................... 244/139; 244/102 R; 244/122 R; 244/147
[58] Field of Search ............... 244/139, 147, 140, 141, 244/138 R, 100 R, 102 R, 122 R, 122 A, 17.11; 297/216, 345, 347; 214/DIG. 10

[56] References Cited

U.S. PATENT DOCUMENTS

| | | | |
|---|---|---|---|
| 1,192,480 | 7/1916 | Van Meter Jr. | 244/147 |
| 1,823,758 | 9/1931 | Owens | 244/139 |
| 2,327,473 | 8/1943 | Wagner et al. | 214/DIG. 10 |
| 2,334,028 | 11/1943 | Raio | 244/139 |
| 2,335,822 | 11/1943 | Bowers | 244/122 A |
| 2,395,548 | 2/1946 | Hojnowski | 244/102 R |
| 2,500,815 | 3/1950 | Gerli et al. | 214/DIG. 10 |
| 2,624,395 | 1/1953 | Johnson | 297/345 |
| 2,935,120 | 5/1960 | Naus | 297/345 X |
| 3,081,059 | 3/1963 | Hastings et al. | 297/216 |
| 3,107,887 | 10/1963 | Dixon et al. | 244/139 |
| 3,229,931 | 1/1966 | Larsen | 244/17.11 |
| 3,295,798 | 1/1967 | Webb | 244/100 R |
| 3,395,881 | 8/1968 | Markham et al. | 244/139 |
| 3,705,745 | 12/1972 | Ambrosius | 297/345 |
| 3,747,877 | 7/1973 | Drew | 244/139 |
| 3,985,388 | 10/1976 | Hogan | 244/122 R |

FOREIGN PATENT DOCUMENTS

| | | | |
|---|---|---|---|
| 423,614 | 4/1911 | France | 244/139 |
| 1,117,208 | 3/1956 | France | 244/140 |
| 590,198 | 3/1959 | Italy | 297/216 |

Primary Examiner—Galen L. Barefoot
Attorney, Agent, or Firm—Cahill, Sutton & Thomas

[57] ABSTRACT

An aircraft letdown system is deployable in the event of power failure or mechanical failure over inhospitable terrain or in the event of environmental conditions which preclude VFR or IFR landings. A parachute system, which is attached to the aircraft at a point in approximate vertical alignment with the aircraft center of gravity, is selectively energized by the pilot when it becomes apparent that a safe normal landing cannot be made. On energization, the parachute canopy and the shroud lines are repositioned from the place of storage to a location external to the aircraft and deployed in the conventional manner. To alleviate the shock of landing to the passengers and cargo, a specially constructed impact absorbing landing gear is extended and the occupants are further protected from the landing shock through impact absorbing seats.

5 Claims, 25 Drawing Figures fig. 5 fig. 4 fig. 6 fig. 7 fig. 8 fig. 9 fig. 10 fig. 12 fig. 14 fig. 11 fig. 13 fig. 17 fig. 15 fig. 16 fig. 19 fig. 20 fig. 21

AIRCRAFT EMERGENCY LETDOWN SYSTEM

The present invention relates to aircraft emergency landing systems and, more particularly, to aircraft having shock absorbing structures and deployable emergency landing parachutes.

Civilian aircraft traffic has been and continues to be on the rise and such traffic is increasingly more oriented toward long distance cross-country flying rather than more numerous flights between local airports. The greater number of long distance cross-country flights tends to increase the number of aircraft which are caught in inclement weather situations because of poor preflight planning or due to inaccurate or incomplete weather information. Additionally, while aircraft power plants and control systems are generally highly reliable, the increased use demands placed upon the power plants and control systems render the probability of their malfunction more likely.

In the event of an aircraft becoming enveloped in inclement weather, the pilot has the choice of descending in the hope of making a safe landing beneath the cloud cover or he must maintain sufficient altitude to remain above the highest terrain features or ground based obstacles. Sometimes, neither of these two choices are available and a high speed crash landing occurs. Should mechanical failure occur in flight rendering it impossible to maintain altitude or rendering it impossible to maintain control of the aircraft, the pilot must immediately select the best possible landing site within his available range and within the limits of his existing control capability. To often, severe injuries and fatalities occur.

It is therefore a primary object of the present invention to provide apparatus for effecting an emergency descent of an aircraft.

Another object of the present invention is to provide an emergency landing system for aircraft, which system is not restricted to terrain of predetermined characteristics.

Yet another object of the present invention is to provide an emergency landing system constructed integrally within an aircraft.

Still another object of the present invention is to provide an emergency aircraft let down system attachable to any aircraft.

A further object of the present invention is to provide shock absorbing gear for aircraft having near zero horizontal velocity during landing.

A yet further object of the present invention is to provide shock absorbing seats for occupants of an aircraft during vertical or near vertical emergency landings.

A still further object of the present invention is to provide an emergency parachute system for aircraft, which parachutes are attached in vertical alignment with the center of gravity of the aircraft.

These and other objects of the present invention will become apparent to those skilled in the art as the description thereof proceeds.

The present invention may be described with more specificity and clarity with reference to the following figures, in which.

Figures 1, 2, 3:
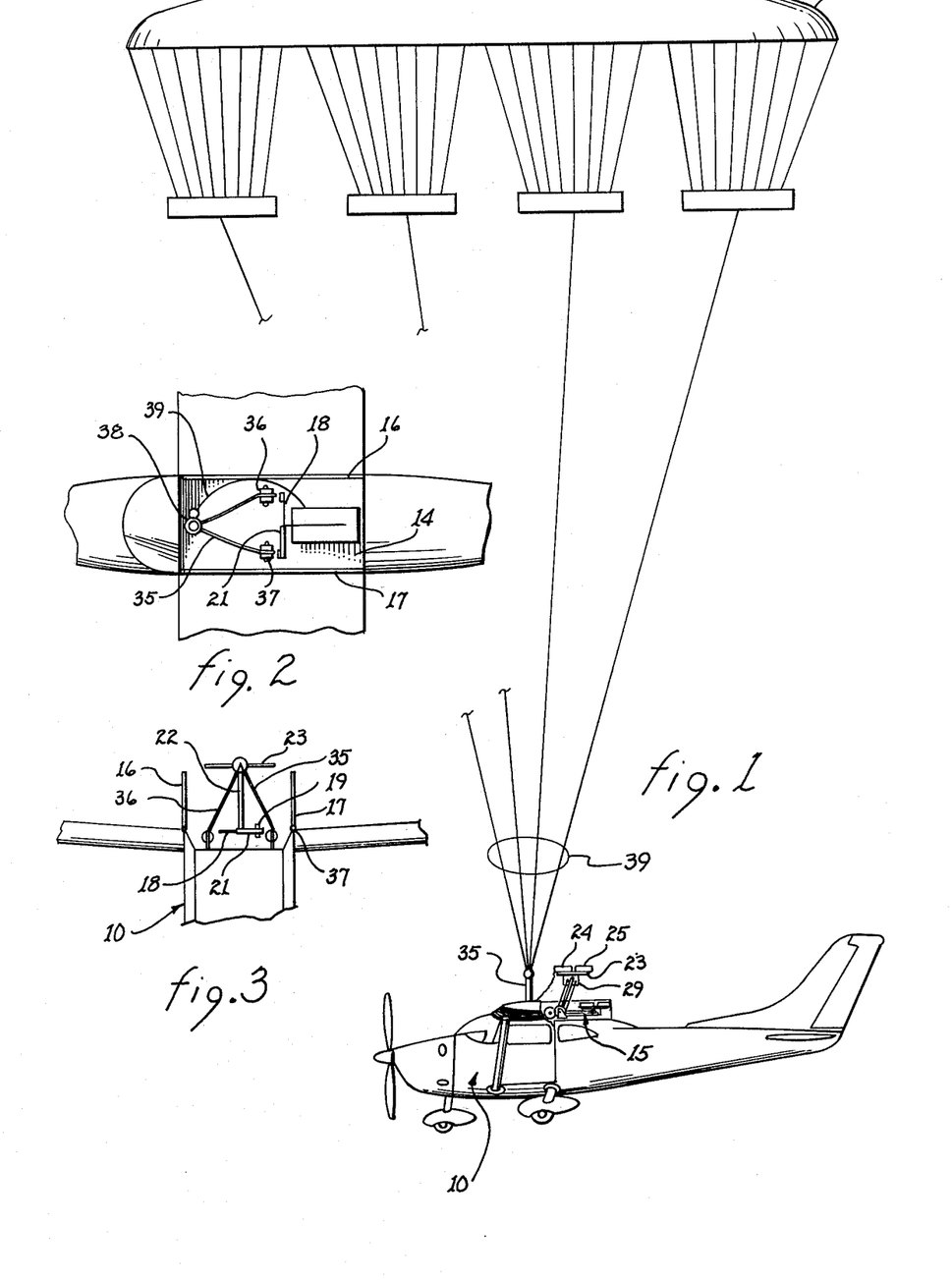
FIG. 1 illustrates a single engine high-wing aircraft having a deployed emergency let down system.
FIG. 2 is a top view of the parachute deployment mechanism.
FIG. 3 is an end view of the parachute deployment mechanism.

A typical single engine high wing aircraft 10 incorporating a parachute deployment system 15 representative of the present invention is illustrated in FIG. 1. Although the parachute deployment system may be positioned in any convenient location within the aircraft commensurate with structural, dynamic loads and center of gravity requirements, it is illustrated as disposed within the center section of the wing forming a part of the fuselage itself. The parachute deployment system is recessed within a commensurately sized compartment 14 closed by a pair of pivotally attached access doors 16 and 17 (see also FIG. 2). The parachute deployment system includes a motor driven gear 19 meshing with a further gear 20 supported by hollow shaft 21 and shaft 18. A supporting arm 22 is rigidly attached to shaft 21 and supports a platform 23 upon which one or more parachutes 24 and 25 are secured. A pair of rods 26, 27 extend from a rigidly mounted bracket 28 to a further bracket 29 attached to platform 23. The rods are spaced apart from one another in parallel relationship and journalled within brackets 28 and 29 such that pivotal movement of supporting arm 22 about shaft 21 results in pivotal movement of platform 23 with respect to the end of the supporting arm to maintain the platform horizontally oriented when supporting arm 22 is pivoted upwardly. A yoke 35 is pivotally attached to the main frame of aircraft 10 at pivot points 36 and 37, which pivot points are in approximate vertical alignment with the center of gravity of the aircraft. A ring 38 or similar securing device is disposed at the extremity of the yoke and serves as the attachment point for risers 39 extending to the canopies of parachutes 24 and 25 (only one canopy 30 is illustrated as it is assumed that the second canopy is laterally adjacent thereto).

On energization of the parachute deployment system, supporting arm 22 will be pivoted to a raised position, nominally to a position of 70° with respect to horizontal; simultaneously, means, such as cammed surfaces or motor driven mechanisms will exert a force upon access doors 16 and 17 to pivot them upwardly and outwardly and accommodate emergence of parachute deployment system 15. After platform 23 has been placed in its raised position, manual or automatic means are energized to deploy the parachutes. Upon deployment, the parachutes will billow, fill and assume the position indicated in FIG. 1. Simultaneously, the emergence of the canopies of the parachutes will exert a force upon risers 39 to raise yoke 35 to the position illustrated in FIG. 1. Alternatively, mechanized means may be employed to raise the yoke simultaneous with raising of platform 23.

The orientation of the parachutes, after deployment, may be side by side, as illustrated, or fore and aft, depending upon criteria pertinent to the parachutes themselves for maximum effectiveness. Although two parachutes have been illustrated in phantom lines and positioned in the undeployed state in tandem upon platform 23, it is contemplated that the parachutes could be located side by side or that only a single parachute could be employed, depending upon criteria such as parachute size, storage space volume, aircraft weight and maximum allowable descent rate.

Turning now to FIGS. 4, 5, 6 and 7, the parachute deployment system will be described in greater detail. Parachute deployment system 15 may be unitized within an enclosure or framework, such as framework 44, which framework is suitably secured to the fuselage of the aircraft wherein it is to be deployed. In the alternative, the function of framework 44 may be accommodated by the aircraft fuselage components. Rigidly mounted shaft 18 may be attached to side 45 of framework 44 by means of plates 46 and 47; in addition, mounting brackets 48 and 49 securely attach the shaft to bottom 50 of the framework. Bracket 28 is rigidly secured to and transverse of shaft 18 by welds or similar means. Pivotally mounted hollow shaft 21 is pivotally attached to side 51 of framework 44 by plates 52 and 53, which plates preclude axial repositioning of the shaft. Means, such as pillow blocks 54 and 55, serve as bearings and supports for pivotally retaining the hollow shaft in place. Cylindrical cavity 56 which may extend through hollow shaft 21 extends at least into one end of the hollow shaft to receive and support one end of shaft 18. Supporting arm 22 is rigidly attached to and extends laterally from hollow shaft 21.

For side by side mounted parachutes 24a and 25a, as illustrated in FIGS. 4, 5, 6 and 7, a transversely oriented shaft 60 is disposed at the extremity of supporting arm 22. One of sleeves 61 and 62 enclose portions of the arms of shaft 60 extending to either side of supporting arm 22. A support 63 is secured to each of sleeves 61 and 62 by a plurality of U-bolts 64, 65, 66 and 67, or the like, whereby support 63 is pivotally mounted with respect to shaft 60. End plates 68 and 69 extending from support 63 preclude unwanted lateral movement of the support with respect to shaft 60. Support 63 serves as the mounting or supporting element for platform 23, or platforms 23a and 23b, as illustrated; these platform(s) may be attached by U-bolts 64–67 or by other devices. Bracket 29 extends from support 63 in proximity to one end thereof, as illustrated.

Figures 6, 7:
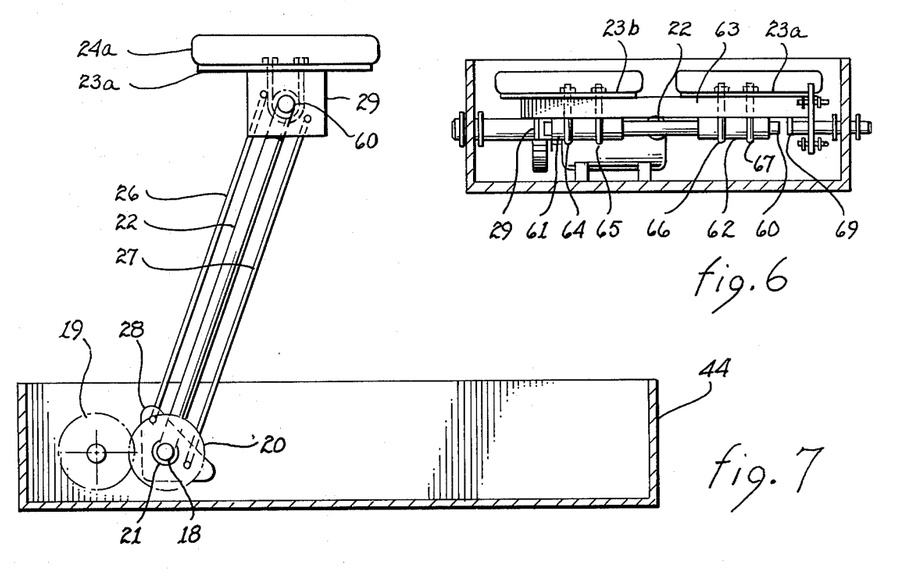
FIG. 6 is an end view taken along lines 6—6, as shown in FIG. 5.
FIG. 7 illustrated the parachute deployment system in the extended position.

Rod 26 extends intermediate brackets 28 and 29 and is pivotally retained by means such as keepers 73, 74 and 75, 76. Similarly, rod 27 extends intermediate brackets 28 and 29 and is pivotally retained by means such as keepers 77, 78 and 79, 80. As stated above, bracket 28 is non-pivotally fixed to shaft 18 and bracket 29 is non-pivotally fixed to support 63 but the latter is pivotally attached to the shaft 60 at the extremity of supporting arm 22. Upon pivotal movement of supporting arm 22 resulting in translation of shaft 60 in an arc about the center of shafts 18 and 21, rods 26 and 27, having one end non-pivotally movable about shaft 18 and 21, will induce rotation of bracket 29 and support 63 about shaft 60 in a direction opposite to that of supporting arm 22. The rotation of support 63 results in commensurate rotation of platforms 23a and 23b about shaft 60. Accordingly, as supporting arm 22 is pivotally raised, the platform(s) for the parachutes is maintained horizontal, as indicated in FIG. 7.

The drive mechanism for the parachute deployment system may include an electrical motor 77 mounted within framework 44 by straps 78 and 79. Output shaft 80 of motor 77 drives gear 19, the latter meshing with gear 20 secured to hollow shaft 21. Since most powered aircraft include means for developing hydraulic pressure, a hydraulic motor can be employed in place of electric motor 77. The means for actuating the motor may include manually operated switches and/or switches automatically actuated in response to predetermined conditions. For large aircraft and airliners, a computer in the cockpit (a small logic system) will be energized for this purpose.

While a push rod mechanism has been illustrated and described for maintaining orientation of the parachute platform(s) during actuation of the parachute deployment system, other mechanisms such as chain and sprocket mechanisms could be equally well employed. Moreover, the supporting arm and other elements could be articulated to permit folding thereof when the parachute deployment system is in the stored configuration while still maintaining the capability of extending the parachutes for a distance beyond the aircraft structure.

Figures 8, 9, 10:
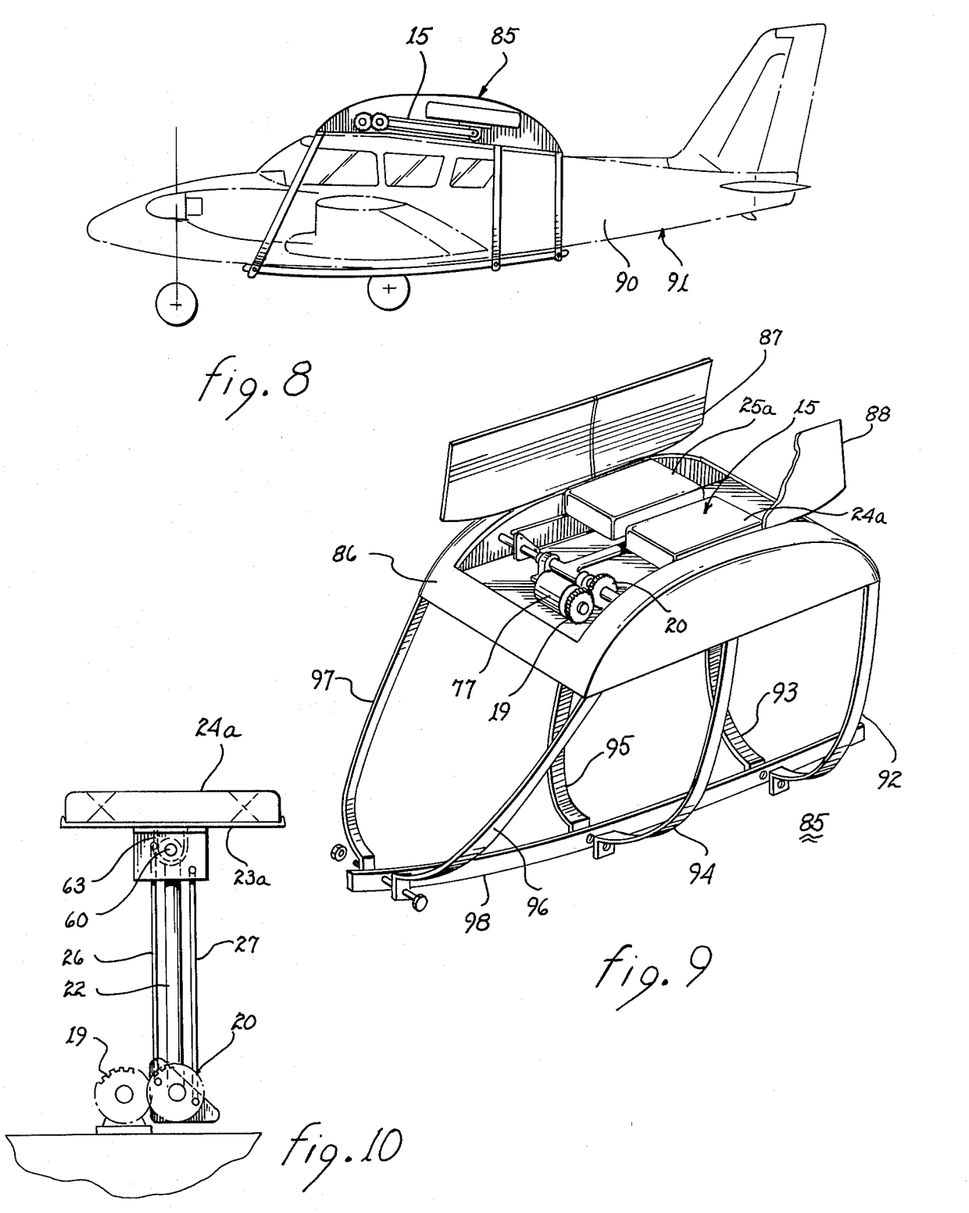
FIG. 8 illustrates a twin engine low wing aircraft having an attachable pod housing a deployable parachute system.
FIG. 9 illustrates the detachable pod and its mounting apparatus.
FIG. 10 is a side view of the parachute deployment apparatus preparatory to deployment of the canopy.

Referring to FIGS. 8, 9 and 10, there is shown an "add-on" aircraft pod 85 which houses a parachute deployment system like that discussed above and which pod may be removably attached to existing aircraft, such as low wing aircraft 91. The pod includes a compartment 86 having an exterior configuration commensurate with the fuselage shape and streamlined to minimize air resistance. A parachute deployment system 15 (as described with respect to FIGS. 4–7) is housed within compartment 86. On energization of the parachute deployment system, panels or doors 87, 88 are pivotally opened by an actuated drive mechanism or simply by the upward movement of the parachute deployment system.

Pod 85 is secured to fuselage 90 of aircraft 91 by means of a plurality of pairs of straps 92 and 93, 94 and 95, 96 and 97. The lower extremities of these straps are secured to one another and to a keel 98 by means such as nut and bolt means, as illustrated in FIGS. 8 and 9. Because it is inherently impossible for any attachment system for pod 85 to be universally useable with all aircraft, the attachment system must inherently vary from aircraft type to aircraft type. Moreover, it may be feasible from a both mechanical and aerodynamic standpoint to attach pod 85 to the structure at the top of fuselage 90. On deployment of the parachute deployment system, the parachutes will be raised above the top of the fuselage as illustrated in FIG. 10.

Although a low winged aircraft is illustrated in FIG. 8, pod 85 may be equally well attached to a mid or high winged aircraft. The only modifications necessary would be the means for attaching the pod to the fuselage of the aircraft.

The attachment point for the risers of parachutes 24a and 25a may be a yoke as illustrated in FIGS. 1 and 2 or the risers may be directly attached to a ring or similar point extending from the framework of fuselage 90 which is located in general vertical alignment with the center of gravity of aircraft 91.

Depending, of course, upon the number and canopy size of the parachutes used in the parachute deployment system, the rate of descent may vary. Nominally, an acceptable rate of descent will be in the range of 18 to 24 feet per second. Such a rate of descent may result in some injury to the occupants of the aircraft upon impact with the ground. To alleviate the impact to the occupants of the aircraft, shock absorbing seats of the type illustrated in FIGS. 11, 12, 13 and 14 may be incorporated within the aircraft. Each seat 100 includes a conventional seat 101, backrest 102, lap belt 103 and shoulder harness (not shown) attached to either the seat or the aircraft framework. Armrests 104 may or may not be used. Each of the legs 106, 107, 108 and 109 are telescoping and spring biased. In the event the seat is supported upon a single pedestal or by less than the conventional number of legs, they would be similarly constructed. Each leg, such as leg 107, includes a base leg 112 having a flange 113 or similar attachment element for attachment to the floor of the aircraft. An upper leg 114 is in telescoping engagement with base leg 112. The ends of a spring, such as coil spring 115 are secured to base leg 112 and upper leg 114 at points 115 and 116, respectively. A pin 117 extends radially from base leg 112 in proximity to the upper extremity thereof and is in penetrating relationship with an axially oriented slot 118 disposed within upper leg 114. The length of the slot limits the axial displacement of upper leg 114 with respect to base leg 112.

Figure 13:
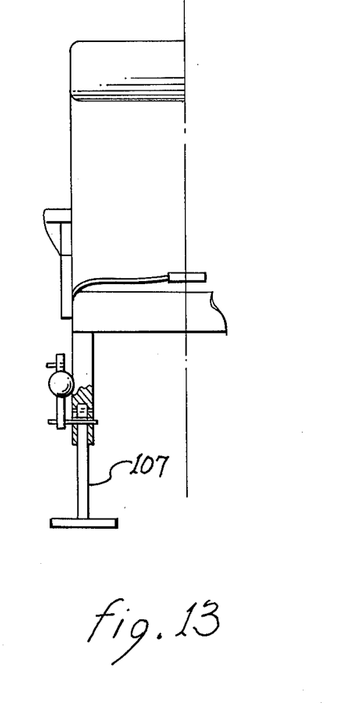
FIG. 13 is a front view of the release mechanism for the seat shown in FIG. 12.
Figure 14:
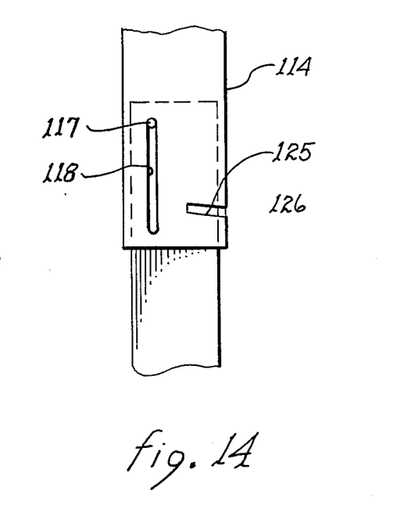
FIG. 14 is a detailed view of the lock mechanism illustrated in FIG. 13.

A locking mechanism 120 is manually operated to lock the seat into the non-shock absorbing mode. The locking mechanism includes a manually operated lever 121 pivotable about pivot point 122. An arm 123 of the lever has a pin 124 disposed at one end thereof. Pin 124, upon pivotal movement of lever 121, slides into or out of engagement with juxtaposed slots 125 and 126 in base leg 112 and upper leg 114, respectively. A linkage 129 extends rearwardly from arm 130 of locking mechanism 120 to a pivotally mounted lever 131 secured to the upper leg of leg 106. Lower end of arm 132 of lever 131 includes a pin 133 for selective engagement within juxtaposed slots of the upper and base legs of leg 106. By inspection, it becomes apparent that upon exerting an upward force on knob 119 of locking mechanism 120, the pins locking the components of legs 107 and 106 become disengaged from their respective slots. Upon disengagement, the coil springs attendant each leg will exert an upward force upon seat 101 and raise the seat.

Figure 11:
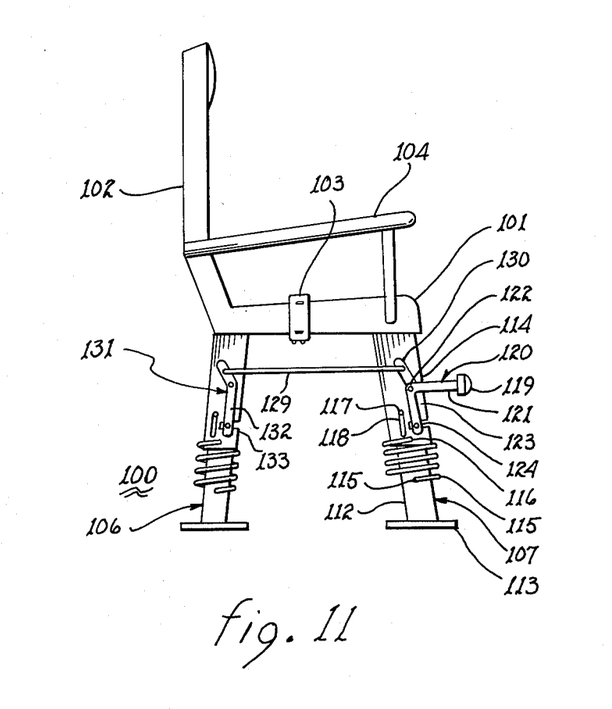
FIG. 11 illustrates a shock mounted seat for aircraft.
Figure 12:
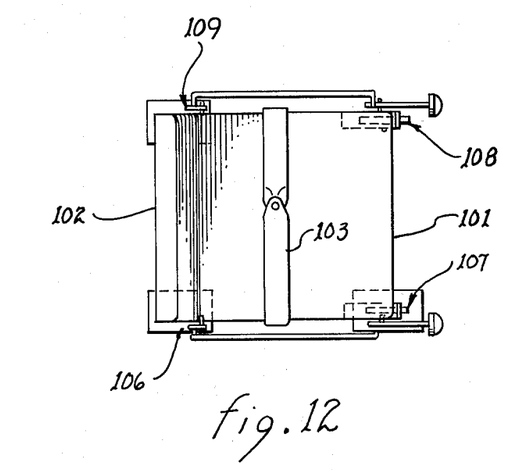
FIG. 12 is a top view of the seat shown in FIG. 11.

In the event of rapid descent of the aircraft wherein seat 100 is mounted and impacts with the ground, the coil springs attendant with each leg wil tend to absorb some of the shock before the coil springs bottom. Accordingly, the shock transmitted to the occupant is reduced by a value commensurate with the shock absorbing capability of the springs.

During normal flight operations of the aircraft wherein seats 100 are disposed, the seat would be in the normally locked position, as indicated in FIG. 11.

The vertical descent by parachute may result in the aircraft impacting the ground with a force greater than that sustainable by the conventional landing gear. To preclude both irreparable damage to the landing gear and its support structure and to lessen the impact force to the occupants and cargo of the aircraft, specially configured impact absorbing auxiliary landing gear may be employed, such as that depicted in FIGS. 15, 16 and 17.

The auxiliary landing gear includes a pair of main legs 141, 142 and a rear leg 143. The pads or feet, identified by numerals 144, 145 and 146, include a plurality of rollers, identified by numeral 148, to accommodate the horizontal velocity attendant almost any descent by parachute and preclude digging in of the auxiliary landing gear. Each of the main legs and rear leg includes telescopingly related upper and lower struts 150 and 151 biased apart from one another by a coil spring 152, as illustrated for the rear leg in FIG. 15. On landing, the upper strut will telescope into the lower strut in proportion to the impact force dampened by the compressive resistance exerted by the coil spring upon the upper strut. Nominally, the spring action of the auxiliary landing gear reduces the impact force transmitted to the aircraft by an amount commensurate with a reduction in velocity of between 2 to 5 feet per second.

Because the auxiliary landing gear is to be used only in dire emergencies and because such emergencies are relatively rare, the landing gear need not be self retracting. Thereby, both the cost and apparatus necessarily attendant to a gear retraction capability are obviated. The description of the apparatus will therefore focus upon the mechanisms for storing and selectively extending the auxiliary landing gear.

Figures 15, 16:
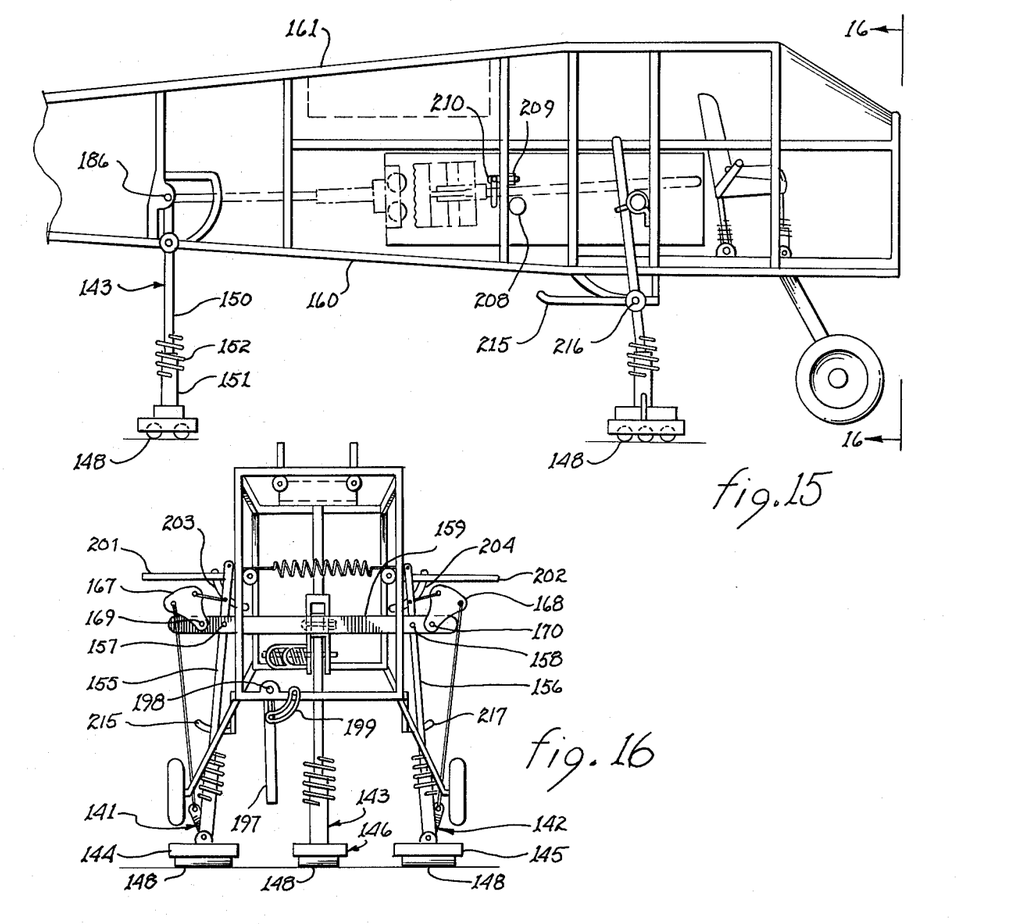
FIG. 15 illustrates the framework of an aircraft fuselage having auxiliary shock absorbing landing gear extending therefrom.
FIG. 16 is a front view of the landing gear illustrated in FIG. 15.

Upper struts 155 and 156 of main legs 141 and 142 are pivotally pinned by pins 157 and 158 to a cross member 159. Necessarily, the cross member must be securely supported by fuselage framework 160 of aircraft 161. The cross member may be journalled at its attachment points to the fuselage or may be disposed within a sleeve rigidly attached to the fuselage. A coil spring 165 is disposed intermediate the upper extremities of struts 155 and 156, which coil spring is in compression to urge the lower extremities of the main legs and feet 144 and 145 to pivot outwardly lateral to aircraft 161. Plates 167 and 168 are pivotally attached to cross member 159 at pivots 169 and 170. First links 171 and 172 interconnect the upper ends of struts 155 and 156 with plates 167 and 168, respectively. Second links 173 and 174 interconnect arms 175 and 176 secured to feet 144 and 145, respectively, which feet are pivotally attached to lower struts 177 and 178 by pins 179 and 180, respectively. By inspection, it becomes apparent that upon pivotal movement of upper struts 155 and 156 about pins 157 and 158, first links 171 and 172 will produce pivotal movement of plates 167 and 168 about pins 169 and 170. Pivotal movement of the plates produces commensurate translation of second links 173 and 174 to pivot feet 144 and 145 about pins 179 and 180, respectively. Thereby, the feet are reoriented from their stored position to their extended position upon actuation of the auxiliary landing gear.

Rear leg 143 is pivotally secured to a bulkhead or cross member 185 of fuselage 160 by a pin 186. A pair of arcuate members 187 and 188 are disposed on either side of upper strut 150 and serve as guides during pivotal movement in the vertical plane of the rear leg. Spring loaded laterally extending pins 189 and 190 engage channels within arcuate members 187 and 188 during pivotal movement of the rear leg and, when the rear leg is in its downward or extended position, the pins lockably engage holes disposed at the lower extremities of the arcuate members.

Figure 17:
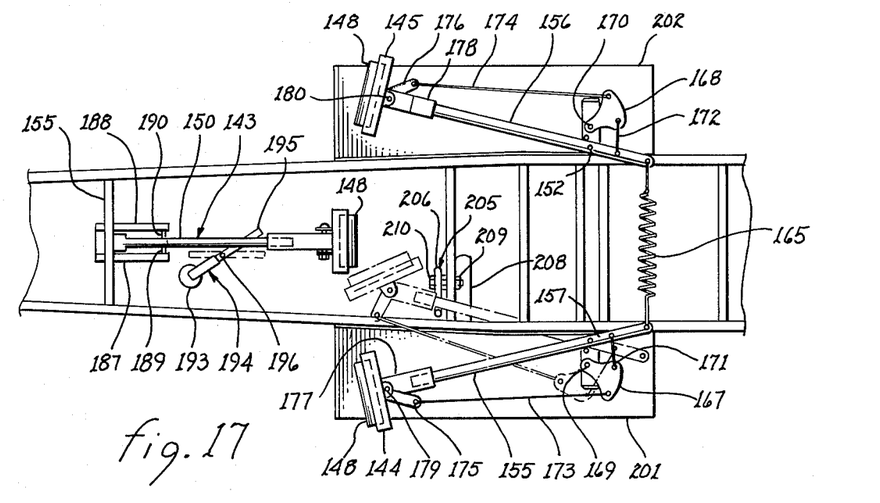
FIG. 17 illustrates a retractable position of the landing gear shown in FIG. 15.

The release mechanism for rear leg 143 includes power means 193, which may be an electric motor, for pivoting one segment 193 of an articulated member 194 such that a second segment 195 pivots about pivot point 196 to the position indicated by the dashed lines in FIG. 17. Such pivotal movement translates segment 195 from a supporting mode beneath strut 150 to a position adjacent the strut and thereby permitting gravity to pivot the rear leg downwardly about pivot point 186. In response to the downward pivotal movement of the rear leg or in response to drive means, a pivotally mounted panel or door 197 (see FIG. 16) is pivoted downwardly about pivot point 198 while guided by a guide and pin member 199 to permit extension of the rear leg from the interior of the fuselage.

The main legs are normally housed within compartments disposed within opposed sides of fuselage 160, which compartments are closed or sealed off by upwardly pivoting doors 201 and 202. These doors may include arcuate shaped guide members 203 and 204. The main legs are retained within the compartments by means of a trip mechanism, generally identified by numeral 205. The trip mechanism for each leg is the same and only that for main leg 141 will be described in detail. A support member 208 attached to fuselage 160 supports the weight of the main leg resting thereupon. Trip mechanism 205 includes a lever 206 extending laterally above and beyond the strut of the attendant main leg and a downwardly extending arm 207 for restricting lateral movement of the main leg. An actuator 209 which upon, either manual or automatic, energization pivots lever 206 about pivot point 210 to raise arm 207 out of engagement with the strut of the main leg.

Upon actuation of trip mechanism 205, the strut of the main leg is no longer physically retained within fuselage 160 upon member 208 and the compressive force exerted by coil spring 165 will induce pivotal movement of the main leg about pin 157. As the main leg pivots, foot 144 will be withdrawn from within the compartment of the main leg to a position lateral to the side of the fuselage. The weight of the main leg, acting about cross member 159, will result in downward pivotal movement of the main leg to the position shown in FIG. 15. Proper positioning of the main leg in its downward position is aided by means of a guide 215 extending laterally from the fuselage. Moreover, a spring loaded pin 216 extending either from guide 215 into strut 155 or from the strut into the guide engages a detent or similar restraint in the adjacent member to maintain the main leg locked in its downward position.

For the sake of simplicity and brevity, the trip mechanism attendant main leg 142 is not illustrated as it is essentially duplicative of trip mechanism 205. Further, a guide 217 and locking pin position main leg 142 in the manner of guide 215 and locking pin 216.

As described above in detail, simultaneous with extension of main legs 141 and 142 from within the respective compartments within fuselage 160, feet 144 and 145 pivot from their stored position to the extended position through translation of the first and second links resulting from the pivotal movement of plates 167 and 168.

Upon impact of the aircraft with the ground, the main legs and the tail will absorb a degree of the impact force through the compression of the coil springs or similar devices disposed within each of the legs. The reduction in impact force exerted upon the fuselage will necessarily result in a reduction of the impact force imposed upon the occupants and the cargo. Previously, an aircraft let down system for relatively lightweight single and twin engine aircraft has been described. For larger aircraft with higher speed capabilities and longer cruise ranges, further options are available to the pilot in the event of inclement weather. However, in the event of major mechanical failure over unlandable terrain where a forced landing would in all probability destroy the aircraft, the aircraft let down system of the present invention would be advantageous. Referring to FIGS. 18, 19, 20 and 21, a variant of the present invention is illustrated.

Figures 18, 18A:
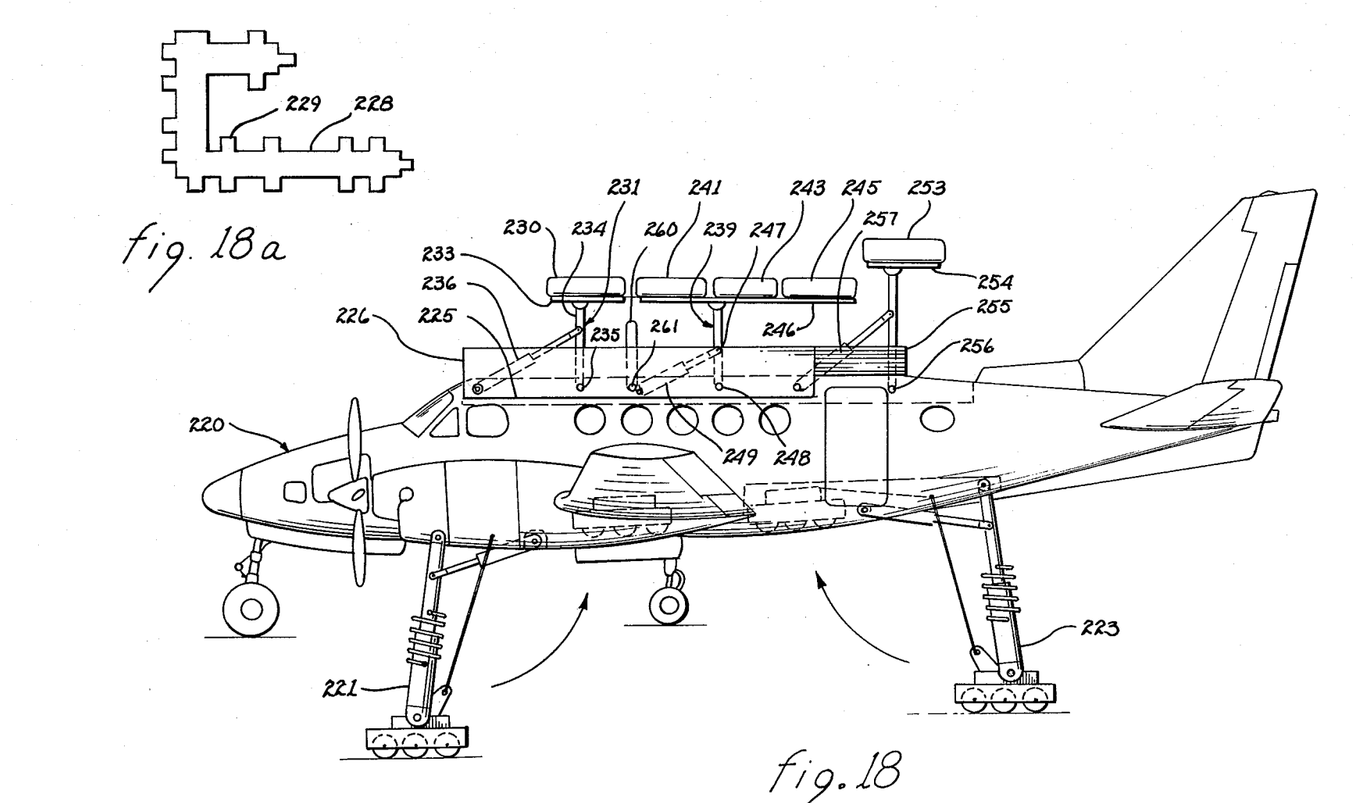
FIG. 18 is a side view of a multi-engine multi-passenger aircraft having a plurality parachute deployment system and auxiliary landing gear mounted integral with the aircraft.
FIG. 18a illustrates a representative configuration of a parachute platform.
Figure 19:
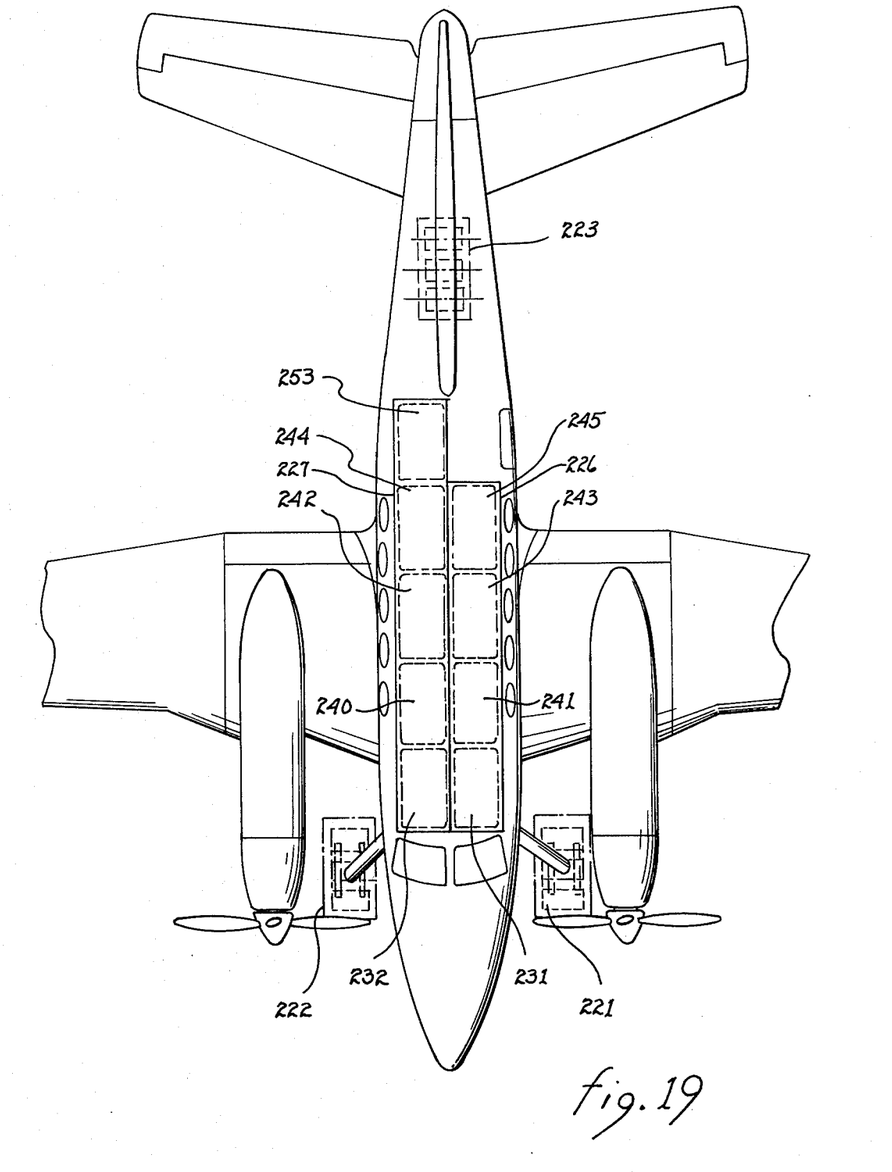
FIG. 19 is a top view of the aircraft shown in FIG. 18.
Figure 20:
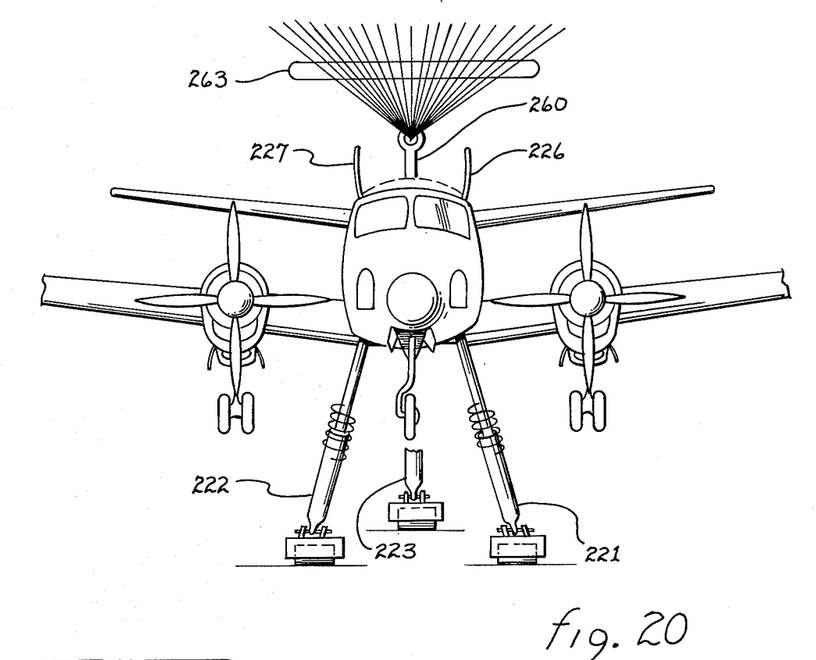
FIG. 20 is a front view of the aircraft shown in FIG. 18 and illustrating the parachute deployment system in the extended position.

A twin engine aircraft having a seating capacity of ten or more passengers, is illustrated in the figures and identified by numeral 220. Auxiliary landing gear of the type described above, may be adapted for use with the aircraft. In example, main legs 221 and 222 are extendible from the fuselage forward of the wing and a rear leg 223 is extendible from a point rearwardly of the wing. The extension mechanism for the auxiliary gear is of the type described above or it may be modified to comport with the specific structural requirements of aircraft 220.

Figure 4:
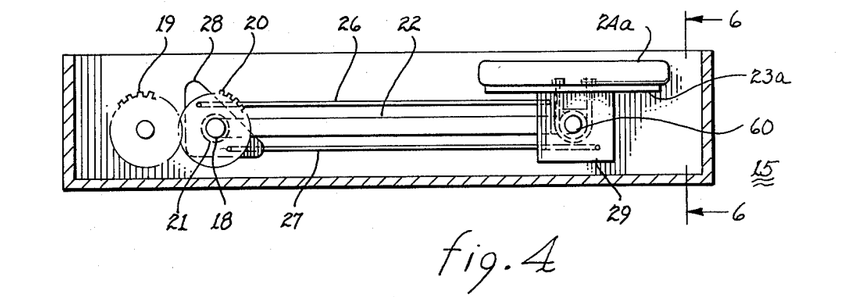
FIG. 4 is a side view of a parachute deployment system useable in any aircraft.
Figure 5:
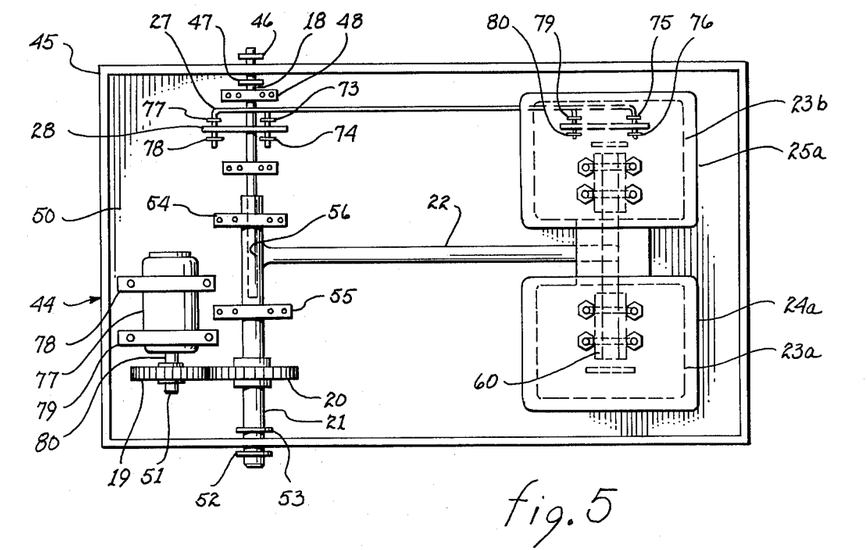
FIG. 5 is a top view of the deployment system shown in FIG. 4.

The parachute deployment system includes a plurality of functionally related but independently positionable platforms for a plurality of parachutes. All of these platforms are normally stored within a compartment 225. This compartment is closed off and sealed by a pair of laterally mounted upwardly pivotable doors 226 and 227. The number of individual parachute deployment systems housed within compartment 225 may vary, depending upon the canopy sizes of the parachutes to be deployed and the gross weight of the aircraft. For illustrative purposes, nine parachutes are depicted in FIGS. 18 and 19 as housed within the compartment. A first deployment system 230 includes two parachutes 231 and 232 supported upon a platform 233. The raising and lowering of the platform by pivoting support arm 234 about pivot point 235 is effected by a hydraulic ram 236. On actuation of the ram to the position illustrated in FIG. 18, the support arm is pivoted rearwardly from an essentially horizontal position to a near vertical position. Rod means, such as that illustrated in FIGS. 4 and 7, are employed to maintain platform 233 essentially horizontal during extension of deployment system 230. A second deployment system 239 includes six parachutes 240, 241, 242, 243, 244 and 245 mounted upon platform 246. A supporting arm 247 pivots about pivot point 248 in response to actuation of hydraulic ram 249. On actuation, the ram pivots the supporting arm rearwardly to raise platform 146. Again, rod means such as that illustrated in FIGS. 4 and 7 are employed to maintain platform 246 in an essentially horizontal position during pivotal movement of the supporting arm. A further deployment system 252 is disposed within the rear segment of compartment 225. It includes a single parachute 253 mounted upon a platform 254 disposed at one end of supporting arm 255. The supporting arm is rotated to its extended about pivot point 256 by a hydraulic ram 257. Rod means are also employed to maintain platform 254 in an essentially horizontal orientation during pivotal movement of supporting arm 255.

The risers from each of the parachutes are attached to a yoke, similar to that described above, or a stanchion 260. This stanchion is attached at attachment point 261 which is essentially in vertical alignment with the center of gravity of aircraft 220. Normally, stanchion 260 is horizontally oriented within compartment 225 to minimize space requirements. The stanchion is raised, either by hydraulic means or automatically through the force exerted upon it by the risers of the parachutes on deployment of the parachute canopies.

FIG. 18a illustrates a platform configuration 228, which may be used for platforms 233, 246 and/or 254. As shown, a plurality of tabs, such as tabs 229, interlock with straps or harnesses of each parachute housing and retain the parachutes upon their respective platforms.

From the above description, it will become apparent that although a plurality of parachutes are employed and arranged in general alignment with the longitudinal axis of aircraft 220, they all have a common attachment point in general vertical alignment with the center of gravity of the aircraft whereby the aircraft will descend in a generally horizontal attitude. This will occur even if one or more of the parachutes fail to fully deploy or becomes tangled. Additionally, the use of the stanchion insures that the attachment point for risers 263 (see FIG. 20) is high enough to preclude entanglement of the risers with the doors for compartment 225 or with any other structure of the aircraft.

Figure 21:
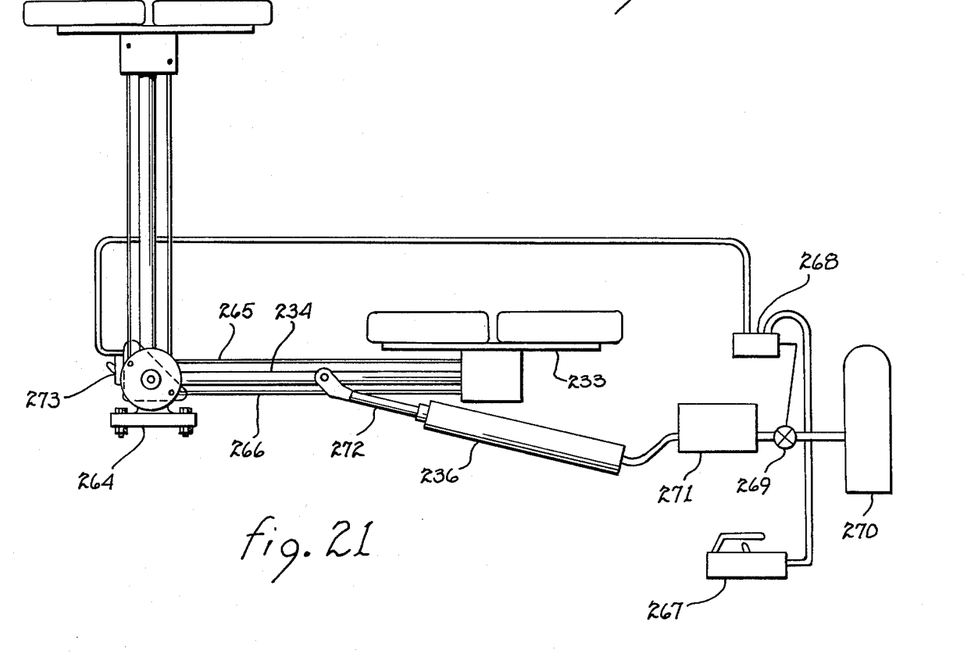
FIG. 21 illustrates a representative hydraulic actuation system for the parachute deployment system shown in FIG. 18.

Referring specifically to FIG. 21, there is illustrated a representative actuation system for the support arms illustrated in FIG. 18. Each supporting arm 234 is attached to a pillow block 264 or similar bearing member. Platform 233 is pivotally attached to the extremity of the supporting arm and rod means 265, 266, similar to that illustrated in FIGS. 4 and 7, extend intermediate the platform and the pillow block for maintaining the platform in a horizontal orientation during pivotal movement of the supporting arm. The pivotal movement of the supporting arm is effected by hydraulic ram 236. On manual or automatic actuation of switch 267, actuator is energized, which in turn opens valve 269. On opening of valve 269, air under pressure within cylinder 270 flows into and pressurizes oil reservoir 271. The oil under pressure within the oil reservoir flows into hydraulic ram 236 and acts upon a piston to extend rod 272. Extension of rod 272, acting upon supporting arm 234, will pivot the supporting arm about pillow block 264 to a near vertical position, as indicated by the dashed lines. On reaching this position, the support arm will trip switch 273, which switch provides an input to actuator 268 to close valve 269.

While the above hydraulic system is described in relatively simplified terms, several aspects pertinent thereto may be pointed out. First, the power for the system is totally independent of the power system for generating thrust. Second, any failure within any power system attendant flight operation of the aircraft will have no effect or bearing upon the capability for actuating each deployment system. And, third, the source of power for the deployment, compressed air, is readily maintainable and replaceable should malfunction occur.

Figure 22:
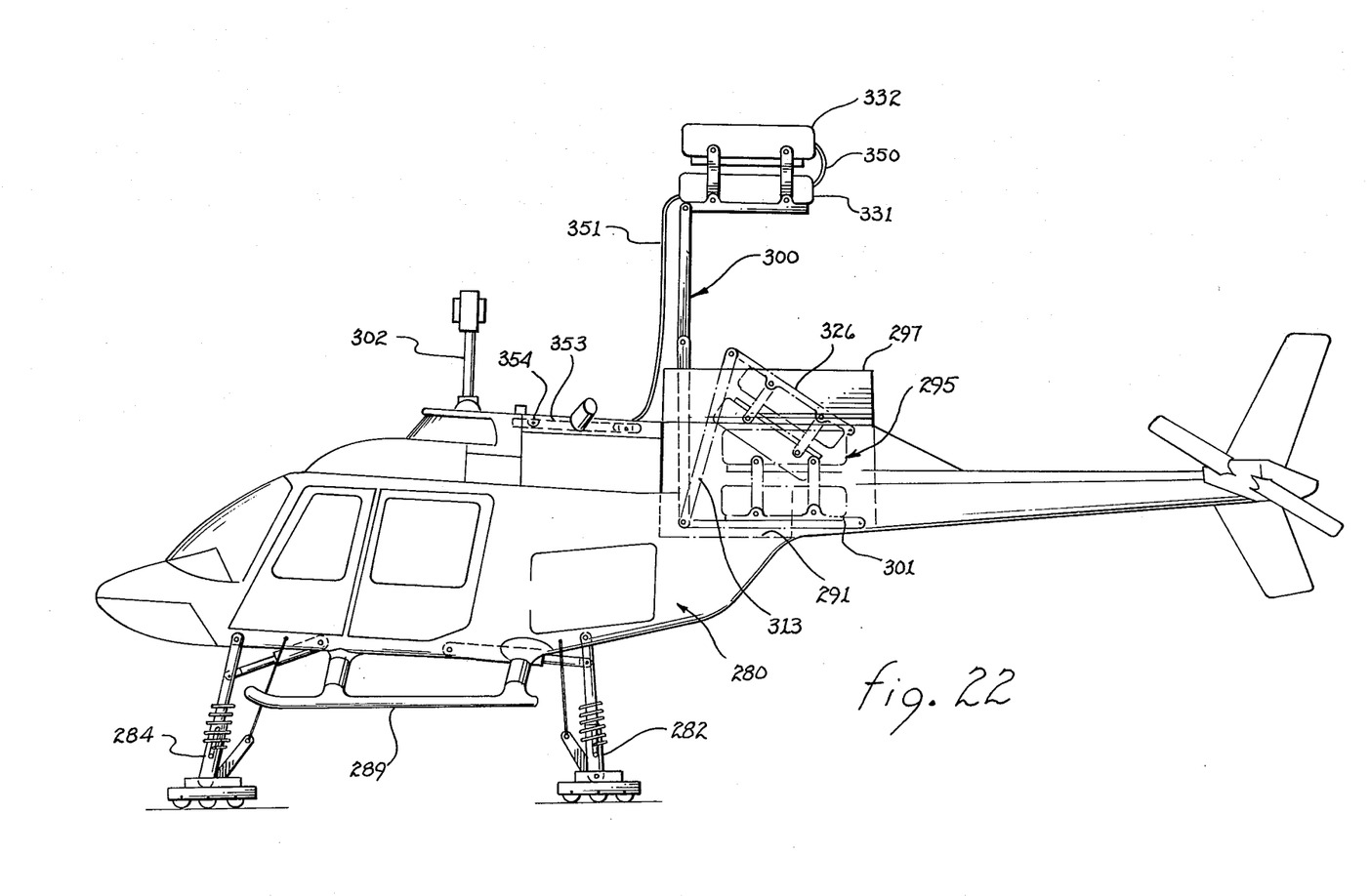
FIG. 22 illustrates a helicopter having an integrally mounted parachute system and auxiliary landing gear.
Figures 23, 24:
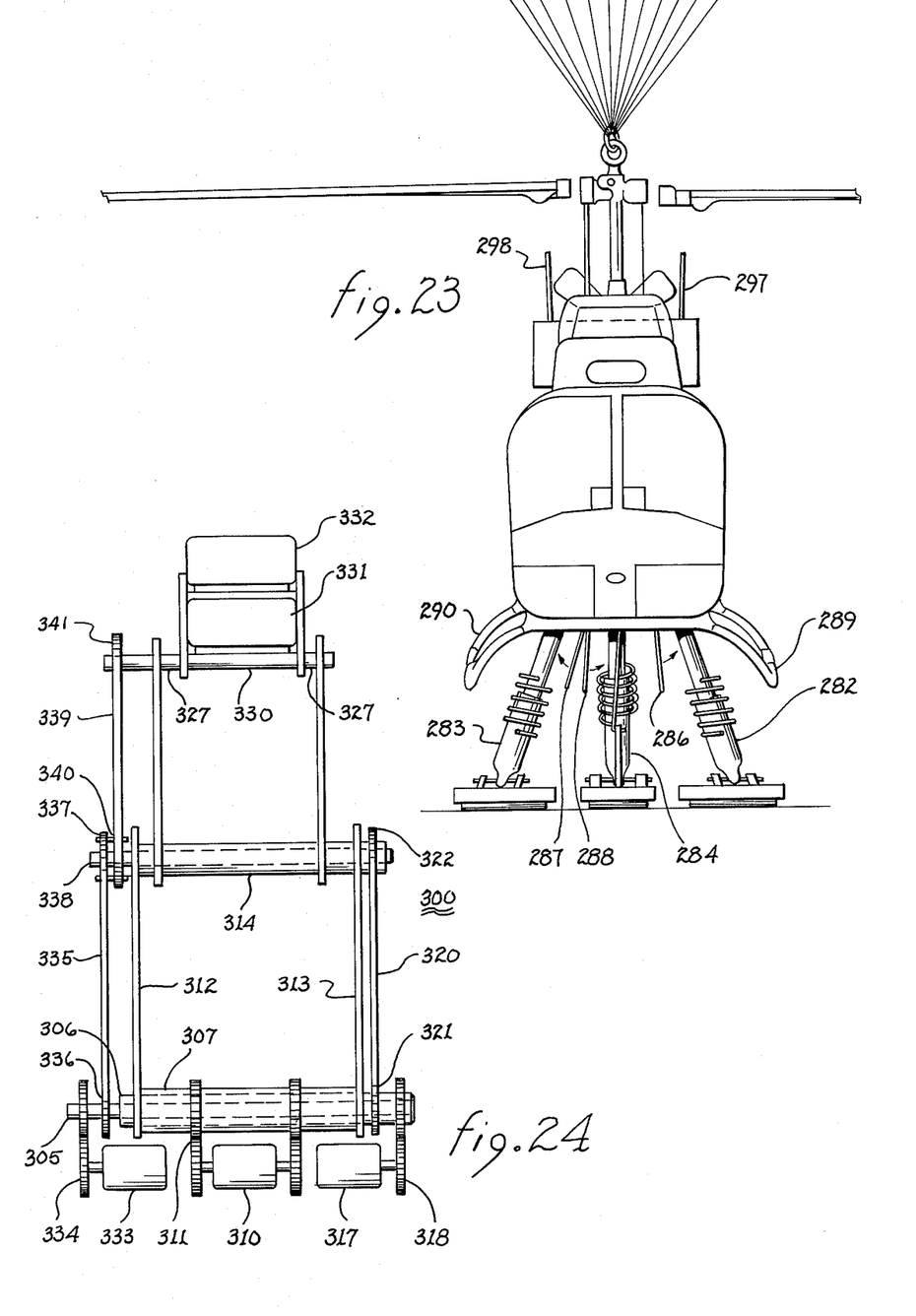
FIG. 23 is a front view of the helicopter shown in FIG. 22.
FIG. 24 illustrates the actuation mechanism for the parachute deployment system shown in FIGS. 22 and 23.

FIGS. 22, 23 and 24 illustrate employment of a parachute deployment system within a helicopter. Helicopter 280 may includes auxiliary landing gear of the type described above where main legs 282, 283 extend downwardly slightly rear of the center of gravity of the helicopter and front leg 284 extends downwardly from the nose of the helicopter. Main legs 282 and 283 are normally disposed within compartments of the helicopter, which compartments are closed by pivotally mounted doors 286 and 287. The front leg is also normally disposed within a compartment in the nose of the helicopter, which compartment is sealed by door 288. As stated above, the auxiliary gear provides a dampening of the impact shock, which shock might otherwise destroy the conventional landing skids 289 and 290 as well as causing major structural damage to the helicopter, occupants and cargo.

A parachute deployment system 295 is normally housed within a compartment 296, which compartment is closed and sealed by pivotally mounted doors 297 and 298.

The parachute deployment system includes an articulated linkage 300 which unfolds from a folded position to an extended position for raising parachute mounting platform 301 from within compartment 296 to an extended position above rotor hub 302 of helicopter 280. While the articulated linkage system 300, as illustrated in FIG. 24, will be described, it is to be understood that other mechanisms are substitutable therefor. Shaft 305 and concentrically positioned hollow shafts 306 and 307 are rotatably mounted, within compartment 296. Power means, such as electric motor 310, acting through a gear train 311, rotates shaft 307 in response to a manually or automatically triggered input signal. A pair of parallel links 312 and 313 are rigidly affixed to hollow shaft 307 and extend therefrom to support a hollow shaft 314. Referring momentarily to FIG. 22, it may be noted that upon actuation of motor 310, links 312 and 313 will pivot counterclockwise until the links have been repositioned from a horizontal orientation within compartment 296 to a vertical orientation and extend out of the compartment. Commensurate with pivotal movement of links 312 and 313, a further electric motor 317, acting through gear train 318, will rotate hollow shaft 306. A chain 320 interconnects sprocket 321 mounted upon shaft 306 and sprocket 322 mounted upon shaft 314. Upon rotation of shaft 306, commensurate rotation of shaft 314 will occur. Parallel links 325 and 326 are affixed to shaft 314 and extend upwardly therefrom to rotatably support shaft 327. Thereby, rotation of shaft 314 in response to energization of motor 317, will result in rotation of parallel links 325, 326 to unfold these links from in between links 312 and 313, as illustrated in FIG. 22. To reorient platform 330 for parachutes 331 and 332, drive means such as electric motor 333 is energized. Energization of motor 333, acting through gear train 334, results in rotation of shaft 305. A drive chain 335 interconnects sprockets 336 and 337 affixed to shafts 305 and 338, respectively, the latter being rotatably positioned within shaft 314 to translate rotation of shaft 305 to shaft 338. Drive chain 339, interconnecting sprockets 340 and 341 affixed to shafts 338 and 327, respectively, translates the rotation of shaft 338 to shaft 337. Rotation of shaft 337 results in commensurate rotation of platform 330 to the horizontal position indicated in FIG. 22. Appropriately located limit switches responsive to rotational movement of the various shafts regulate the operating cycle of the various electric drive motors platform 330 is repetitively positionable at its final extended horizontal location.

Shrouds 350 and 351 extending downwardly from the canopies of parachutes 331 and 332 are attached to the end of a pivotally extendible yoke or stanchion 353. This stanchion is pivotally attached at a point 354 which is in approximate vertical alignment with the center of gravity of the helicopter. Thereby, on deployment of parachutes 331 and 332, the force exerted by the risers will raise the stanchion to its upright position whereby the risers are clear of rotor hub 302. In the alternative, further mechanisms may be incorporated to simultaneously raise stanchion 353 upon actuation of the drive mechanism for the articulated linkage.

To preclude the possibility of fouling of the parachutes by the rotor of the helicopter, the rotors may be attached to the rotor hub by explosive bolts, which, upon energization, jettison and rotor blades. Prior to actuation of articulated linkage 300, rotation of the rotor must cease or the rotor blades must be jettisoned to preclude damage to the extending linkage prior thereto.

It is to be understood that impact absorbing seats 100 may be deployed in aircraft 220 or helicopter 280.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A removable emergency aircraft letdown system for aircraft, said system comprising in combination:
    a. at least one positionable platform for supporting at least one parachute sized and configured to support the aircraft at an acceptable rate of descent, each said platform being erectable from a first position to a second position;
    b. erection means for erecting each said platform from the first position to the second position and deploying each parachute;
    c. a pod juxtaposed with the top of the aircraft fuselage for storing each said platform and said erection means while each said platform is in the first position;
    d. attachment means for securing the risers of each parachute to a point in general vertical alignment with the center of gravity of the aircraft;
    e. actuation means for operating said erection means; and
    f. strap means for securing said pod to said aircraft, said strap means extending downwardly from said pod to encircle the fuselage of the aircraft, said strap means includes a keel disposed longitudinally along the underside of the aircraft fuselage whereby, said system is detachably attachable to the aircraft to provide for descent by parachute of the aircraft in the event of an airborne emergency.

2. The system as set forth in claim 1 wherein said erection means comprises:
    a. a supporting arm for raising each said platform with respect to said pod;
    b. power means for effecting movement of each said supporting arm; and
    c. orientation means for orienting each said platform to a predetermined orientation at the second position.

3. The system as set forth in claim 2 including first pivot means disposed at one end of each said supporting arm for pivotally securing said supporting arm to said pod and second pivot means disposed at the other end of said supporting arm for pivotally securing said supporting arm to said platform.

4. The system as set forth in claim 3 wherein said orientation means comprises:
    a. a first bracket secured to said pod, said first bracket being generally aligned transverse to the axis of rotation of said one end of each said supporting arm;
    b. a second bracket secured to said platform, said second bracket being generally aligned transverse to the axis of rotation of said other end of each said supporting arm; and
    c. a pair of rods extending intermediate and pivotally attached to said first and second brackets.

5. The system as set forth in claim 4 wherein said attachment means comprises:
    a. a yoke;
    b. a pair of pivot points for interconnecting the arms of said yoke with said pod; and
    c. ring means disposed at the apex of said yoke for receiving the end of the risers of each parachute; whereby, pivotal movement of said yoke positions the point of attachment of the risers of each parachute at a location external to said pod.

* * * * *